Nov. 17, 1964     J. H. REED     3,157,148

DRIVING FORCE INDICATOR FOR SAILBOATS

Filed Sept. 25, 1961

INVENTOR.
JAMES H. REED
BY
ATTORNEYS

United States Patent Office 3,157,148
Patented Nov. 17, 1964

3,157,148
DRIVING FORCE INDICATOR FOR SAILBOATS
James H. Reed, 1230 Cedar Road, Ambler, Pa.
Filed Sept. 25, 1961, Ser. No. 140,346
2 Claims. (Cl. 114—90)

This invention relates to apparatus serving as an aid in the handling the navigation of a sailing boat.

Driving forces are transmitted from the sails to the hull primarily through the mast, and, to a lesser extent, through stays, sheets and spars. This driving force is transmitted to the mast in a forward direction, and in accordance with the invention means are provided to indicate the forward component of strain in the mast, which is a function of said driving force, and on any given course optimum forward speed is obtained by trimming the sails to obtain maximum strain in the mast.

Accordingly, it is the main object of the invention to make possible the attainment of optimum speed in a sailing boat.

Further objects and advantages will become apparent from the following description, read in conjunction with the accompanying drawing, in which.

Figure 1:
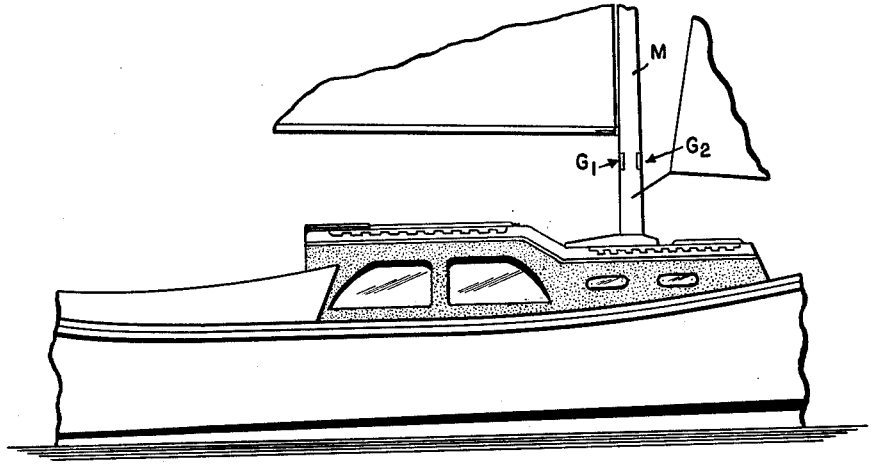
FIGURE 1 is a profile of a yacht illustrating the attachment of strain gauges to the main mast.
Figure 2:
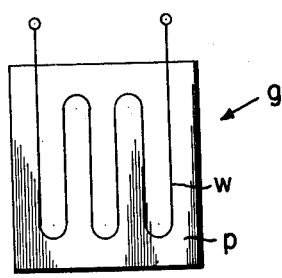
FIGURE 2 is a face view of a conventional resistance wire strain gauge.

As mentioned above, in accordance with the invention the sails are trimmed in accordance with indications of strain in the mast. Various types of strain gauges are, of course, available though the usual resistance wire type is ideally suited for purposes of the invention. A typical gauge $g$ of this type is shown in FIGURE 2, and comprises a wire $w$ carried by a paper backing $p$. The illustrated gauge is of the unidirectional type as compared to the more complex "rosette" types having wires oriented at 90° and/or 45° angles. Resistance wire gauges operate on the principle that the resistance of a wire varies as a function of the strain therein.

In accordance with the invention at least one gauge is applied to either the front or the back of the mast, i.e. along the ship's center or keel line, and preferably adjacent its lower portion. There is illustrated a yacht of sloop rig having its mast M stepped in the hull in the usual manner. It will be understood, however, that the invention is applicable to other types of sailing vessels including those of cat, yawl and ketch rigging. The invention may be practiced by measuring strain in a mizzen mast, for example, as well as in the main mast. Gauges $G_1$ and $G_2$ are shown adhered at the 0° and 180° circumferential portions of the mast M. Either or both of the gauges $G_1$ and $G_2$ may be employed, for technical reasons discussed hereafter. Gauges $G_1$ and $G_2$ correspond to the type of gauge $g$ shown in FIGURE 2.

In practice, it is important that resistance wire strain gauges of the illustrated type be properly applied to the structural member, and that they be protected as much as possible from moisture. The gauge or gauges $G_1$ and $G_2$ are adhered to the mast (at an area at which the surface finish has been removed) by one of the standard nitro-cellulose cements specifically developed for the purpose. The gauge should then be protected from moisture by one of the standard preparations; for example, a suitable wax coating.

Figure 3:
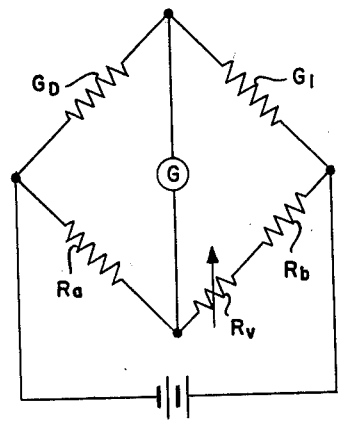
FIGURE 3 is a diagram of an electrical bridge circuit used in connection with strain readings.

Strain readings from wire resistance gauges are most commonly obtained by means of circuits of the Wheatstone and Kelvin types. If only one of the gauges $G_1$ and $G_2$ is employed, readings of strain may be obtained by the Wheatstone bridge circuit diagrammed in FIGURE 3. In the use of such gauges it is standard procedure to compensate for strains attributable only to temperature and humidity variations by the use of a "dummy" gauge which is a duplicate of the "active" gauge. The dummy gauge is not subjected to stresses in the structure under test, but is subjected to the same temperature and humidity as the active gauge. Referring then to FIGURE 3, the dummy gauge is indicated as $G_D$ and is wired in the bridge arm opposite that of the active gauge, which for purposes of description may be assumed to be the gauge $G_1$. Resistances $R_A$ and $R_B$ are fixed, and a variable resistance $R_V$ is provided to balance the bridge. Readings of balance or unbalance are from the galvanometer G. For the present nautical purposes the bridge preferably is direct current operated as indicated.

Figure 4:
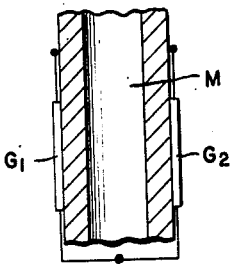
FIGURE 4 is an axial cross-section of the mast indicating one manner of wiring the strain gauges.

In the testing of structures it is sometimes desired to measure bending stresses only, and to cancel out axial stresses. This normally is carried out by providing two active gauges in "back-to-back" relationship, i.e. on opposite sides of a stressed member. In practicing the invention this method of measurement may be particularly desired, and in such case there is used the arrangement shown in FIGURES 4 and 5. It will be noted from FIGURE 4 that both gauges $G_1$ and $G_2$ are used actively, being adhered to the mast in back-to-back relationship and connected in opposite arms of the bridge. Dummy gauges are not necessary in this arrangement. When thus connected compensations for temperature and humidity are automatically made and sensitivity is doubled because resistance changes of opposite signs are additive.

Various types of indicating circuits and instruments may be used, but whatever type of indicator is employed, it is preferably mounted in a position to be read from near the helm and/or the main sheet so that handling of the sheet may be easily coordinated with readings of mast strain. It will be understood that through the main sheet the boom is moved inboard or outbard to vary the angular setting of the sails.

Figure 5:
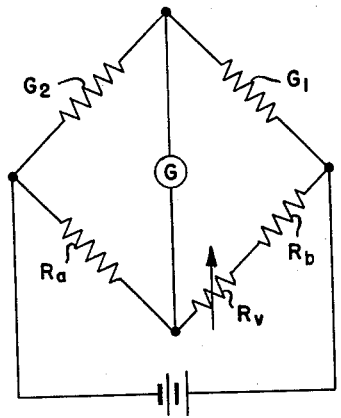
FIGURE 5 is a diagram of the electrical bridge circuit used in the reading of gauges wired as shown in FIGURE 4.

In operation, whether the circuit connection of FIGURE 3 or 5 is used, the bridge preferably is balanced to obtain a null galvanometer reading when the mast is unstressed, e.g. when the sails are down or in light airs. With the boat underway on a given course, whether it be downwind or on a reach, the main sail is adjusted to a setting at which a maximum mast strain reading is obtained, thereby to obtain maximum forward thrust and speed.

It will be understood that various departures from the specifically disclosed forms of the invention may be made without departing from the scope thereof as defined by the following claims.

What is claimed is:

1. The combination comprising a sail boat having at least one mast and a sail carried thereby, said sail transmitting a forward driving force to said boat through said mast, a strain gauge positioned on said mast so as to detect the magnitude of the forward component of the strain imposed on said mast by said sail, and means connected to said strain gauge for indicating the magnitude of said forward component of strain.

2. The combination comprising a sail boat having at least one mast and a sail carried thereby, said sail transmitting a forward driving force to said boat through said mast, an electrical strain gauge positioned on said mast so as to detect the magnitude of the forward component of the strain imposed on said mast by said sail, and means connected to said strain gauge for indicating the magnitude of said forward component of strain.

References Cited by the Examiner

UNITED STATES PATENTS

| | | | |
|---|---|---|---|
| 1,613,890 | 1/27 | Herreshoff | 114—90 |
| 2,416,664 | 2/47 | Ruge | 73—88.5 X |
| 2,485,977 | 10/49 | Mains | 73—88.5 X |
| 2,626,338 | 1/53 | Mitchell | 73—88.5 X |
| 3,070,332 | 12/62 | Hess | 244—77 |

FERGUS S. MIDDLETON, *Primary Examiner.*

DAVID SCHONBERG, *Examiner.*